United States Patent [19]
Lopez

[11] Patent Number: 4,816,502
[45] Date of Patent: Mar. 28, 1989

[54] STABILIZATION OF EPOXY/NITROPARAFFIN SOLUTIONS

[75] Inventor: John A. Lopez, Houston, Tex.

[73] Assignee: Shell Oil Company, Houston, Tex.

[21] Appl. No.: 43,717

[22] Filed: Apr. 29, 1987

[51] Int. Cl.$^4$ ............................ C08K 5/42; C08K 5/32; C08L 63/00

[52] U.S. Cl. ........................ 523/414; 523/418; 523/420; 523/453; 523/456; 528/90

[58] Field of Search ........................ 528/90, 109, 111.3; 523/414, 418, 420, 453, 456

[56] References Cited

U.S. PATENT DOCUMENTS

| | | | |
|---|---|---|---|
| 2,811,495 | 10/1957 | Wittcoff | 528/111.3 |
| 3,785,997 | 1/1974 | Godfrey | 528/90 |
| 4,101,459 | 7/1978 | Andrews | 528/109 |
| 4,331,582 | 5/1982 | Barayan | 528/90 |
| 4,350,790 | 9/1982 | Chattha | 528/90 |
| 4,352,898 | 10/1982 | Albers | 523/414 |
| 4,495,317 | 1/1985 | Albers | 523/414 |
| 4,501,832 | 2/1985 | Albers | 523/414 |

*Primary Examiner*—C. Warren Ivy

[57] ABSTRACT

A composition is provided comprising an epoxy resin, a nitroparaffin and a sulfonic acid. The presence of the sulfonic acid retards gellation of nitroparaffin-containing epoxy resin compositions intended for use in water-dispersible coating formulations cured with modified polyamine resins.

21 Claims, No Drawings

STABILIZATION OF EPOXY/NITROPARAFFIN SOLUTIONS

BACKGROUND OF THE INVENTION

This invention relates to epoxy resin-based water-reducible coating compositions. In a specific embodiment, the invention relates to the stabilization of nitroparaffin compositions which have utility in modified polyamine-cured epoxy resin coating formulations.

High-performance coatings for protection of metal surfaces of ships, aircraft, bridges, large liquid containers, and other structures exposed to corrosive environments must be resistant to the corrosive effects of water and solvents. Excellent coating properties can be obtained from the use of solvent-borne, two-package epoxy coatings. The use of organic solvents in coating formulations is increasingly restricted, however, by air-quality regulations controlling the volatile organic content (VOC) of solvent-borne coatings.

The need for low-VOC coating formulations has led to the development of water-dispersible epoxy coating formulations in which a portion of the organic solvent is replaced with water. However, conventional amine-cured epoxy systems are not readily water-dispersible. The addition of surfactant-type emulsifying agents is undesirable because such agents tend to remain in the coating and adversely affect coating properties. It has been found that epoxy systems containing amino-functional curing agents modified to have emulsifying properties are more readily water-dispersible. Such modified polyamine curing agents, however, have a short pot life. The pot life of modified polyamine resin curing agents has been lengthened by addition of a nitroparaffin to the coating system. Such nitroparaffin-containing systems exhibit good coating properties and water-dispersibility, but premixed epoxy/nitroparaffin solutions used to prepare the water-dispersible coating formulations have a tendency to darken in color and gel with prolonged storage, particularly at temperatures encountered during hot weather storage.

It is therefore an object of the invention to provide nitroparaffin-containing formulations which have good storage stability.

SUMMARY OF THE INVENTION

According to the invention, a sulfonic acid is added to a composition comprising a nitroparaffin to retard gelation of the composition. The thus-stabilized nitroparaffin can be included in epoxy resin compositions intended for use, with modified polyamine resin curing agents for the epoxy resin, in water-dispersible coating formulations.

DETAILED DESCRIPTION OF THE INVENTION

The invention composition includes a nitroparaffin. For use in water-dispersible epoxy coating formulations, it is desirable for the nitroparaffin to have sufficiently low molecular weight to evaporate from the coating at approximately room temperature. The nitroparaffin is preferably one having a molecular weight less than about 150. Suitable nitroparaffins can generally be described by the formula $C_nX_{2n+1}$, where n is an integer from 1 to 4; each X is independently selected from halogen (preferably chlorine), hydrogen and $NO_2$; and at least one X, preferably no more than two, is $NO_2$. Such compounds include, for example, nitromethane, nitroethane, 1-nitropropane, 2-nitropropane, 1-nitrobutane, 2-nitrobutane, 1,3-dinitropropane and 1-chloronitropropane. The preferred nitroparaffins are 2-nitropropane and nitroethane because of the relatively long pot lives of coating compositions containing these.

The invention composition contains a stabilizing amount of a sulfonic acid which can be described by the formula $R-SO_3H$, in which R is a substituted or unsubstituted hydrocarbyl moiety. R can be aliphatic or aromatic, monomeric or polymeric. R will generally be substituted or unsubstituted $C_1-C_8$ aliphatic or $C_6-C_{20}$ aromatic. Examples of $R-SO_3H$ additives include toluenesulfonic acid, methane sulfonic acid, dodecylbenzene sulfonic acid, trifluoromethane sulfonic acid and benzene sulfonic acid. The preferred sulfonic acid, because of its availability and effectiveness as a nitroparaffin stabilizer, is p-toluenesulfonic acid.

In a first embodiment, the invention composition includes, in addition to the nitroparaffin and the sulfonic acid, an epoxy resin. Such a composition can be used as the resin package of a two-package coating formulation. The epoxy resin can be any curable epoxy resin having, on the average, more than one vicinal epoxide group per molecule. The epoxy resin can be saturated of unsaturated, aliphatic, cycloaliphatic, aromatic or heterocyclic, and may bear substituents which do not materially interfere with the curing reaction. They may be monomeric or polymeric.

Particularly suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater than 0, commonly in the range of 0 to 10, preferably in the range of 0 to 2. Other suitable epoxy resins can be

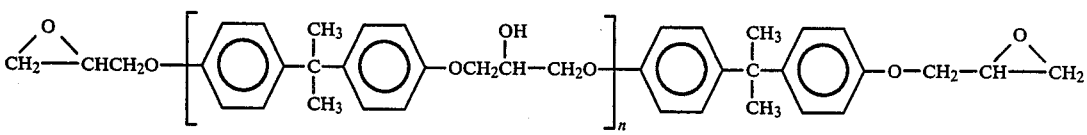

prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for water-dispersible coating formulations have molecular weights generally within the range of 100 to about 10,000, preferably about 200 to about 1500. The commercially available epoxy resin EOPN ® Resin 828, a reaction product of epichlorohydrin and 2,2-bis(4-hydroxyphenyl)propane (bisphenol-A) having a molecular weight of about 400, an epoxide equivalent weight (ASTM D-1652) of about 185–192, and an n value in formula I above of about 0.2, is an example of a suitable epoxy resin for water-dispersible coating formulations.

Also favored in water-dispersible coating formulations, because of the low viscosity and superior coating properties of the resin, are advanced polyglycidyl ethers of polyhydric phenols obtained by the catalyzed reaction of an epoxy resin of relatively low molecular weight with a phenolic compound to produce an epoxy resin having a relatively high molecular weight. Such an epoxy resin is commercially available from Shell Chemical Company as EPON ® Resin 834, a product of the advancement reaction of EPON ® Resin 828 with bisphenol-A in the presence of a phosphonium halide catalyst. EPON ® Resin 834 has a number average molecular weight of about 505 and an epoxide equivalent weight of about 230–290. When such an advanced epoxy resin is employed, it is likely that the composition will additionally contain residual portions of the advancement catalyst employed in resin preparation, such as an alkyl triphenyl phosphonium halide or alkylene bis(triphenyl phosphonium halide).

In that embodiment of the invention composition which includes an epoxy resin, a nitroparaffin and a sulfonic acid, the nitroparaffin will generally be present in an amount effective to reduce the viscosity of the epoxy resin for convenient handling, generally within the range of about 3 to about 50 weight percent, preferably from about 5 to about 25 weight percent, based on the weight of the epoxy resin. The sulfonic acid will be present in an amount effective to stabilize the nitroparaffin, as evidence by a reduction in the tendency of the nitroparaffin-containing composition to darken in color or gel with storage. Generally, the sulfonic acid will be present in the composition in an amount greater than about 0.001 weight percent, preferably from about 0.01 to about 1 weight percent, most preferably from about 0.01 to about 0.2 weight percent, based on the weight of the epoxy resin.

The sulfonic acid can most conveniently be added to the composition in a solvent of diluent, preferably a mixture of the nitroparaffin and a minor amount of an alcohol such as isopropyl alcohol.

In a second embodiment of the invention, the invention composition contains a nitroparaffin and a sulfonic acid, as described above, and a modified polyamine resin. Such a composition can be used as the curing package of a two-package coating formulation. Curing agents which are particularly suitable for use in waterborne coating systems include modified polyamine resins prepared by reacting aliphatic or cycloaliphatic polyamines with compounds containing functional groups which react with the amine group, such as glycidyl ether-containing or carboxy-containing compounds. Reaction products of polyamines with glycidyl ether-group containing compounds are known as "polyamine-epoxy adducts." Reaction products of carboxylic acids and polyamines are known as "polyamide resins." The latter are usually prepared by condensation of the carboxylic acid with excess amounts of polyalkylene polyamines, particularly polyethylene-polyamines, to prepare poly-amino-amides or poly-amino-imidazolines. Polyamides based on dicarboxylic acids having more than 10 carbon atoms, particularly those based on $C_{36}$ dicarboxylic acid, are preferred because of the water resistance and flexibility of the resulting coatings.

Particularly preferred poly-amino-amides and poly-amino-imidazolines are based on saturated or unsaturated natural fatty acids; on polymeric fatty acids; on dicarboxylic acids obtained by carboxylation of unsaturated monovalent natural fatty acids; and polycarboxylic acids obtained by the addition of di- or tricarboxylic acids or their derivatives, particularly maleic acid anhydrides, to natural unsaturated fatty acids.

Examples of other carboxylic acids useful in preparing various polyamine resins and further details about such curing agents are provided in U.S. Pat. No. 4,352,898, the disclosure of which is hereby incorporated by reference.

The modified polyamine resin preferably has an amine value less than about 400, preferably about 150 to about 300, for long pot life and coating flexibility. "Amine value" refers to the milligrams of KOH which are equivalent to each free amine group in one gram of the resin.

The modified polyamine resin is preferably chosen from (a) polyamine-epoxy adducts; (b) polyamides which are the reaction products of polyamines and carboxylic acids selected from mono-carboxylic acids and poly-carboxylic acids and mixtures thereof in which less than about 75% by weight of the carboxylic acids are dicarboxylic acids having 10 or fewer carbon atoms; (c) polyamide-epoxy adducts; and cominations of these. As used herein, the term "modified polyamine resin" includes all the aforementioned compounds and classes of compounds. Suitable modified polyamine resins are available commercially from the Henkel Corporation as Verasmid ® polyamide resins.

The final coating formulation can optionally include reactive diluents such as monoepoxies (diglycidyl ether and styrene oxide, for example) and epoxy resins (vinyl cyclohexene dioxide and triglycidyl ether of trimethyol propane, for example).

The final coating formulation will include sufficient diluent liquids to reduce the viscosity of the formulation to a level permitting application to a surface as a coating. Preferably, the diluent will include the maximum amount of water which is consistent with the properties of the coating desired. Water-dispersible coating compositions as described above will generally include from about 500 to about 2000 weight percent water, based on the weight of the epoxy resin, although this can vary widely with the constituents of the composition and its intended application.

The modified polyamine and the epoxy resin components of the composition can be used with or without a diluent. Diluents may be desirable to control viscosity, improve handling or add bulk for convenient volumes. Organic solvents such as alcohols; aliphatic, naphthenic and aromatic hydrocarbons; ethers; esters; and ketones can be employed. Specific examples of such organic diluents include ethyl alcohol, isopropyl alcohol, butyl alcohol, 2-butoxy ethanol, monoethyl ether of diethylene glycol, ethylene glycol of monobutyl ether, tetrahydrofuryl alcohol, ethylene glycol monoethyl ether, oxylene, dioxane, ethyl acetate, isopropyl acetate, butyl acetate, amyl acetate, acetone, methyl ethyl ketone, methyl isobutyl ketone, hexane, heptane, octane, methyl cyclohexane, and the like. Preferably at least about five weight percent organic solvent is used with the modified polyamine resin for viscosity control.

Suitable solvents for the epoxy resin include ketones, esters, alcohols and ethers. Specific examples of these include methyl ethyl ketone, methyl isobutyl ketone, diisobutyl ketone, xylene, acetone, dibutylsulfate, nonylphenol, and the like. Mixtures of polar and non-polar organic solvents, such as a ketone and a hydrocarbon, may be preferred in some cases.

In water-dispersible systems according to the present invention, water will generally be the principal diluent for reducing the viscosity of the coating composition. The organic solvent will generally be used in relatively small volumes. Preferably, the amount of the organic solvent used is sufficiently low that the coating composition has a VOC of less than about 450 grams per liter, preferably less than about 350 grams per liter, where VOC is calculated according to the formula $VOC = (VOM \times 454)/3.785(1-W)$, where VOM is pounds of Veletile organic material per gallon of coating material as applied, and W is the volume fraction of water per gallon in the coating as applied.

The final coating formulation can include conventional coating additives such as accelerators; fillers, such as asbestos, albality, silica, mica flint powder, quartz, cryolite, Portland cement, limestone, atomized alumina, barytes, talc, zinc powder, pryophyllite, clay, diatomaceous earth; pigments, such as titanium dioxide, red lead, basic lead silica chromate, basic zinc chromate, zinc, lead, barium and strontium chromates, calcium plumbate, barium metaborate, and calcium, strontium and zinc molybdates; and resinous modifiers, such as phenolic resins, urea resins, melamine resins, acrylic resins, polyester resins, vinyl resins, bituminous resins, and polystyrene. The coating formulation will generally not contain added surfactant-type emulsifying agents.

Coating compositions according to the invention can be provided as a two-container system. The first container contains the epoxy resin component and the second container contains the modified polyamine resin curing agent for the epoxy resin. The nitroparaffin can be included in either the first or second container. The sulfonic acid will generally be included in the container which contains the nitroparaffin. Sufficient nitroparaffin is provided so that when the contents of the two containers are combined in about stoichiometric proportions to form a coating, water in an amount of at least about 50 percent by weight of the epoxy resin can be added to the coating composition. Preferably, the nitroparaffin is provided with the epoxy resin because interaction between the nitroparaffin and modified polyamine resin can shorten the shelf life of the modified polyamine resin product.

When the final coating formulation is prepared by mixing the two containers, the amount of the modified polyamine added to the epoxy resin will be that amount which is effective to cure the epoxy resin under the selected coating/curing conditions. Generally, the amount will be approximately stoichiometric, so that there is about 0.7 to about 1.1 reactive NH groups for each epoxy group present.

Water can be packaged in the curing agent container or the epoxy resin container, or it can be added during or after mixing of the two containers.

The aqueous coating formulation comprises a nitroparaffin in an amount of at least about 2 weight percent, generally about 2 to about 50 weight percent, and preferably about 15 to about 30 weight percent, based on the weight of the epoxy resin. The coating formulation will generally include at least about 50, generally about 500 to about 2000 weight percent, water based on the weight of the epoxy resin.

The water-reduced coating composition can be applied by conventional coating methods such as brush-coating, spray coating and air coating. Curing can be generally carried out by exposure of the applied composition to ambient conditions for 1 hour to several days.

The following examples demonstrate the superior stability of epoxy/nitroparaffin solutions containing a sulfonic acid stabilizer.

EXAMPLE 1

EPON 834 Resin was prepared by charging, to a 3 liter reactor, 1541 g of EPON 828, 159 g bisphenol-A and 1.0 g triphenylphosphine ethyliodide fusion catalyst. The reaction mixture was heated to 335° F. in stages over 1.75 h and held at 335° F. for about 1 hour. The product mixture was cooled to 240° F. and 300 g of nitroethane solvent was added.

Stability tests were conducted on 100-g samples of the prepared solution using the additives shown in Table 1. Phosphoric and acetic acid were added as 1% solutions in nitroethane. Citric acid was added as a 1% solution in a 90:10 weight percent solution of nitroethane and isopropyl alcohol. Paratoluene sulfonic acid was added as a 3 weight percent solution in a 90:10 solution of nitroethane and isopropyl alcohol.

Samples of each preparation were stored in a sealed tube. Color measurements were made at the intervals shown in Table 1 using Gardner color standards. Weight per epoxide measurements (ASTMD-1652) were made on non-gelled sampels of PTSA-containing samples, as shown in Table 2.

As can be seen from the results of the tests, with no modification the epoxy/nitroethane solution became dark and gelled after 30 days. Phosphoric, citric and acetic acids had some effect in improving storage stability, but were generally ineffective at high temperature. p-Toluene-sulfonic acid addition significantly reduced changes in color and viscosity, even under high-temperature conditions.

EXAMPLE 2

In an attempt to reduce the alkalinity of the environment for the nitroethane, the preparation of EPON® 834 Resin was carried out in the presence of 0.025 weight percent water. Nitroethane/acid solutions of the produce were prepared as in Example 1. Results of stability tests are shown in Tables 3 and 4. Although the solutions were somewhat more stable than those in Example 1, viscosity increases with storage, particularly at high temperature, were unacceptable in the absence of p-toluenesulfonic acid.

TABLE 1

| Additive | | Gardner Color Tests of Epoxy/Nitroethane Solution | | | | | | |
|---|---|---|---|---|---|---|---|---|
| | | Storage at 160° F. | | | | | Storage at 200° F. | |
| Acid | Meq/100 g | Initial | 9 Days | 22 Days | 26 Days | 30 Days | 5 Days | 9 Days |
| None | — | 1 | 1 | 7–8 | 14–15 | >18 (Gel) | 9 | >18 (Gel) |
| Phosphoric | 0.01 | 1 | 3 | 5–6 | 8–9 | >18 (Gel) | 9 | >18 (Gel) |
| Phosphoric | 0.10 | 1 | 3 | 5–6 | 9–10 | >18 (Gel) | 9 | >18 (Gel) |
| Phosphoric | 0.50 | 1 | 3 | 5–6 | 6–7 | 14–15 | 9 | >18 (Gel) |
| Citric | 0.01 | 1 | 3–4 | 5–6 | 7–8 | >18 (Gel) | 9 | >18 (Gel) |

TABLE 1-continued

| Additive | | Gardner Color Tests of Epoxy/Nitroethane Solution | | | | | | |
|---|---|---|---|---|---|---|---|---|
| | | Storage at 160° F. | | | | | Storage at 200° F. | |
| Acid | Meq/100 g | Initial | 9 Days | 22 Days | 26 Days | 30 Days | 5 Days | 9 Days |
| Citric | 0.10 | 1 | 3–4 | 4–5 | 6–7 | 10–11 | 5–6 | >18 (Gel) |
| Citric | 0.50 | 1 | 2–3 | 3–4 | 6–7 | 13–14 | 9 | >18 (Gel) |
| Acetic | 0.01 | 1 | 3–4 | 3 | 4–5 | 7–8 | 4 | >18 (Gel) |
| Acetic | 0.10 | 1 | 3 | 5–6 | 9–10 | >18 (Gel) | 10 | >18 (Gel) |
| Acetic | 0.50 | 1 | 3 | 4–5 | 6–7 | 13–14 | 9 | >18 (Gel) |
| p-Toluene Sulfonic | 0.01 | 1 | 3 | 6–7 | 9–10 | >18 (Gel) | 9 | >18 (Gel) |
| p-Toluene Sulfonic | 0.10 | 1 | 2–3 | 2–3 | 2–3 | 2–3 | 3 | 5 |
| p-Toluene Sulfonic | 0.50 | 1 | 2–3 | 2–3 | 3–4 | 3–4 | 3 | 4 |

TABLE 2

| | | Epoxide Content Stability (WPE) | | | | | | |
|---|---|---|---|---|---|---|---|---|
| None | — | 252 | — | — | — | Gel | — | Gel |
| p-Toluene Sulfonic | 0.01 | 252 | — | — | — | Gel | — | Gel |
| p-Toluene Sulfonic | 0.10 | 252 | — | — | — | 260 | — | 255 |
| p-Toluene Sulfonic | 0.50 | 260 | — | — | — | 258 | — | 256 |

TABLE 3

| Additive | | Gardner Color Tests of Epoxy/Nitroethane Solution | | | | | | |
|---|---|---|---|---|---|---|---|---|
| | | Storage at 160° F. | | | | | Storage at 200° F. | |
| Acid | Meq/100 g | Initial | 9 Days | 22 Days | 26 Days | 30 Days | 5 Days | 9 Days |
| None | — | 2 | 1 | 4–5 | 5–6 | 9–10 (almost Gel) | 7 | >18 (Gel) |
| Phosphoric | 0.01 | 2 | 4–5 | 4–5 | 5–6 | 7–8 | 7 | >18 (Gel) |
| Phosphoric | 0.10 | 2 | 4 | 2–3 | 3–4 | 5–6 | 7 | >18 (Gel) |
| Phosphoric | 0.50 | 2 | 3–4 | 3–4 | 3–4 | 6–7 | 7 | >18 (Gel) |
| Citric | 0.01 | 2 | 3 | 4–5 | 4–5 | 7–8 | 7 | >18 (Gel) |
| Citric | 0.10 | 2 | 5 | 4–5 | 4–5 | 4–5 | 4–5 | >18 (Gel) |
| Citric | 0.50 | 2 | 4 | 3–4 | 5–6 | 5–6 | 4–5 | >18 (Gel) |
| Acetic | 0.01 | 2 | 3 | 4–5 | — | 11–12 | 7 | >18 (Gel) |
| Acetic | 0.10 | 2 | 3 | 5–6 | 5–6 | 8–9 | 8–9 | >18 (Gel) |
| Acetic | 0.50 | 2 | 4–5 | 4–5 | 4–5 | 7–8 | 8–9 | >18 (Gel) |
| p-Toluene Sulfonic | 0.01 | 2 | 4–5 | 3–4 | 4–5 | 4–5 | 4–5 | >18 (Gel) |
| p-Toluene Sulfonic | 0.10 | 2 | 4–5 | 2–3 | 3–4 | 3–4 | 4–5 | 5 |
| p-Toluene Sulfonic | 0.50 | 2 | 4 | 3–4 | 3–4 | 3–4 | 4–5 | 5 |

Epoxy fusion reaction including 0.025% water addition to neutralize catalyst and reduce solution alkalinity.

TABLE 4

| | | Epoxide Content Stability (WPE) | | | | | | |
|---|---|---|---|---|---|---|---|---|
| None | — | 248 | — | — | — | (almost Gel) | — | Gel |
| p-Toluene Sulfonic | 0.01 | 259 | — | — | — | 260 | — | Gel |
| p-Toluene Sulfonic | 0.10 | 254 | — | — | — | 254 | — | 258 |
| p-Toluene Sulfonic | 0.50 | 254 | — | — | — | 256 | — | 255 |

I claim:

1. A composition comprising:
   (a) an epoxy resin having, on the average, more than one vicinal epoxide group per molecule;
   (b) a nitroparaffin which can be described by the formula $C_nX_{2n+2}$, in which n is an integer from 1 to about 4, each X is independently selected from hydrogen, halogen and $NO_2$, and at least one X is $NO_2$; and
   (c) a sulfonic acid which can be described by the formula $R$—$SO_3H$, in which R is a substituted or unsubstituted hydrocarbyl moiety, the sulfonic acid present in an amount effective to stabilize the composition.

2. The composition of claim 1 in which the sulfonic acid is toluenesulfonic acid.

3. The composition of claim 1 in which the nitroparaffin is selected from the group consisting of nitromethane, nitroethane, 1-nitropropane, 2-nitropropane, 2-nitrobutane, 1,3-dinitropropane and 1-chloronitropropane.

4. the composition of claim 1 in which the sulfonic acid is present in an amount of from about 0.001 to about 1 weight percent, based on the weight of the epoxy resin.

5. The composition of claim 4 in which the nitroparaffin is selected from the group consisting of 2-nitropropane and nitroethane.

6. The composition of claim 4 in which the nitroparaffin is present in the composition in an amount of about 3 to about 50 weight percent, based on the weight of the epoxy resin.

7. The composition of claim 1 further comprising an effective amount of a modified polyamine resin curing agent for the epoxy resin.

8. The composition of claim 7 in which the modified polyamine resin curing agent is a polyamide reaction product of a polyamine and a carboxylic acid.

9. The composition of claim 7 in which the modified polyamine resin curing agent is an epoxy-amine adduct reaction product of a polyamine and an epoxy resin.

10. The composition of claim 6 further comprising water.

11. The composition of claim 9 further comprising an organic solvent.

12. The composition of claim 2 in which the sulfonic acid is present in an amount of from about 0.01 to about 1 weight percent, based on the weight of the epoxy resin.

13. A composition comprising:
(a) an epoxy resin;
(b) a modified polyamine resin present in an amount effective to cure the epoxy resin;
(c) a nitroparaffin which can be described by the formula $C_nX_{2n+2}$, in which n is an integer from 1 to about 4, each X is independently selected from hydrogen, halogen and $NO_2$, and at least one X is $NO_2$; and
(d) a sulfonic acid which can be described by the formula $R—SO_3H$, in which R is a substituted or unsubstituted hydrocarbyl moiety.

14. The composition of claim 13 in which the nitroparaffin is present in an amount within the range of about 2 to about 50 weight percent, based on the weight of the epoxy resin.

15. the composition of claim 13 further comprising at least about 50 weight percent water, based on the weight of the epoxy resin.

16. The composition of claim 13 in which the sulfonic acid is p-toluenesulfonic acid.

17. The composition of claim 13 in which the sulfonic acid is present in an amount within the range of about 0.001 to about 1 weight percent.

18. The composition of claim 13 in which the modified polyamine resin has an acid value less than about 400.

19. The composition of claim 13 in which the modified polyamine resin is selected from the group consisting of polyamine-epoxy adducts, polyamide reaction products of polyamines and carboxylic acids and polyamide-epoxy adducts.

20. The composition of claim 13 in which the sulfonic acid is present in an amount within the range of about 0.001 to about 1 weight percent, based on the weight of the epoxy resin.

21. A method for coating a surface comprising applying to the surface the composition of claim 13 and subjecting the surface to conditions effective for curing the epoxy resin.

* * * * *